US010663736B2

United States Patent
Tanaka et al.

(10) Patent No.: US 10,663,736 B2
(45) Date of Patent: May 26, 2020

(54) IMAGE DISPLAY DEVICE AND DISPLAY APPARATUS

(71) Applicant: Sony Corporation, Tokyo (JP)

(72) Inventors: Eiichi Tanaka, Chiba (JP); Hirokazu Tatsuta, Kanagawa (JP); Shin Hasegawa, Kanagawa (JP); Yuichi Hasegawa, Tokyo (JP); Kenta Kawamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/782,054

(22) PCT Filed: Mar. 26, 2014

(86) PCT No.: PCT/JP2014/058605
§ 371 (c)(1),
(2) Date: Oct. 2, 2015

(87) PCT Pub. No.: WO2014/168010
PCT Pub. Date: Oct. 16, 2014

(65) Prior Publication Data
US 2016/0062123 A1  Mar. 3, 2016

(30) Foreign Application Priority Data
Apr. 11, 2013  (JP) ................. 2013-082828

(51) Int. Cl.
*G02B 27/01* (2006.01)
*G02B 13/06* (2006.01)
*G02B 9/16* (2006.01)

(52) U.S. Cl.
CPC ........... *G02B 27/0176* (2013.01); *G02B 9/16* (2013.01); *G02B 13/06* (2013.01);
(Continued)

(58) Field of Classification Search
CPC ................ G02B 27/0176; G02B 27/02; G02B 27/0983; G02B 9/16; G02B 2027/0154;
(Continued)

(56) References Cited

U.S. PATENT DOCUMENTS 5,473,365 A  12/1995 Okamura
5,479,224 A  12/1995 Yasugaki et al.
(Continued)

FOREIGN PATENT DOCUMENTS

CN  1391126 A  1/2003
CN  1813213 A  8/2006
(Continued)

OTHER PUBLICATIONS

Chinese Office Action dated Mar. 22, 2018 in connection with Chinese Application No. 201480002757.2 and English translation thereof.
(Continued)

*Primary Examiner* — Travis S Fissel
(74) *Attorney, Agent, or Firm* — Wolf, Greenfield & Sacks, P.C.

(57) ABSTRACT

A display apparatus is provided with a frame 20 that is mounted to the head portion of an observer 10, and an image display device 20 which is attached to the frame 20, an image display device 30 is provided with an image forming device 40, an optical system 50 that guides an image from the image forming device 40 to a pupil of an observer, and a support member $60_1$ that supports the image forming device 40. When a direction of the support member $60_1$ that corresponds to a first direction of an image is set as an X direction, and a direction of the support member $60_1$ that corresponds to a second direction of the image, which is different from the first direction, is set as a Y direction, a support surface 61 of the support member 60 that supports
(Continued)

the image forming device 40 is curved along the X direction and/or the Y direction, and therefore, the image forming device 40 is curved.

11 Claims, 11 Drawing Sheets

(52) U.S. Cl.
 CPC .. *G02B 27/0172* (2013.01); *G02B 2027/0123* (2013.01); *G02B 2027/0132* (2013.01); *G02B 2027/0154* (2013.01); *G02B 2027/0161* (2013.01); *G02B 2027/0169* (2013.01)

(58) Field of Classification Search
 CPC ...... G02B 2027/0161; G02B 2027/169; G02B 2027/185
 USPC ........ 359/631, 632, 644, 645, 663, 664, 671, 359/785, 716
 See application file for complete search history.

(56) References Cited

U.S. PATENT DOCUMENTS

| | | | |
|---|---|---|---|
| 5,486,841 A | 1/1996 | Hara et al. | |
| 5,739,797 A | 4/1998 | Karasawa et al. | |
| 5,748,375 A | 5/1998 | Yamana | |
| 5,774,096 A | 6/1998 | Usuki et al. | |
| 5,793,339 A | 8/1998 | Takahashi | |
| 5,828,432 A * | 10/1998 | Shashidhar | G02F 1/13439 349/139 |
| 5,835,279 A | 11/1998 | Marshall et al. | |
| 6,100,862 A | 8/2000 | Sullivan | |
| 6,124,837 A | 9/2000 | Usuki et al. | |
| 6,172,657 B1 * | 1/2001 | Kamakura | G02B 27/017 345/4 |
| 6,239,771 B1 | 5/2001 | Usuki et al. | |
| 6,529,331 B2 * | 3/2003 | Massof | G02B 27/017 345/9 |
| 7,446,941 B2 | 11/2008 | Fukuda | |
| 8,411,134 B2 | 4/2013 | Tomita | |
| 8,570,242 B2 | 10/2013 | Chosokabe et al. | |
| 8,739,797 B2 | 6/2014 | Bonutti | |
| 8,797,433 B2 | 8/2014 | Kaizu et al. | |
| 8,861,090 B2 | 10/2014 | Mukawa | |
| 8,907,865 B2 | 12/2014 | Miyawaki et al. | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,164,221 B2 | 10/2015 | Akutsu et al. | |
| 9,201,242 B2 | 12/2015 | Miyawaki et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,569,897 B2 | 2/2017 | Miyawaki et al. | |
| 9,658,456 B2 | 5/2017 | Mukawa | |
| 9,709,809 B2 | 7/2017 | Miyawaki et al. | |
| 9,726,890 B2 | 8/2017 | Akutsu et al. | |
| 9,753,284 B2 | 9/2017 | Machida et al. | |
| 9,759,920 B2 | 9/2017 | Akutsu et al. | |
| 9,766,453 B2 | 9/2017 | Mukawa | |
| 9,791,701 B2 | 10/2017 | Ato et al. | |
| 9,899,000 B2 | 2/2018 | Takahota et al. | |
| 9,933,621 B2 | 4/2018 | Hirano et al. | |
| 9,952,435 B2 | 4/2018 | Tanaka et al. | |
| 9,972,135 B2 | 5/2018 | Mukawa | |
| 10,018,846 B2 | 7/2018 | Machida et al. | |
| 10,302,946 B2 | 5/2019 | Aiki | |
| 10,338,388 B2 | 7/2019 | Hirano et al. | |
| 10,477,174 B2 | 11/2019 | Mukawa | |
| 10,527,859 B2 | 1/2020 | Tanaka et al. | |
| 10,534,172 B2 | 1/2020 | Tanaka et al. | |
| 10,539,793 B2 | 1/2020 | Mukawa | |
| 10,540,822 B2 | 1/2020 | Mukawa | |
| 2001/0030850 A1 * | 10/2001 | Ditzik | G06F 1/1616 361/679.3 |
| 2002/0047952 A1 | 4/2002 | Kawata | |
| 2002/0181115 A1 | 12/2002 | Massof et al. | |
| 2002/0196554 A1 * | 12/2002 | Cobb | G02B 27/0172 359/633 |
| 2004/0212776 A1 | 10/2004 | Spitzer et al. | |
| 2004/0227703 A1 * | 11/2004 | Lamvik | G02B 27/0172 345/76 |
| 2005/0046954 A1 | 3/2005 | Achtner | |
| 2006/0056069 A1 * | 3/2006 | Kao | G02B 9/14 359/785 |
| 2006/0098153 A1 * | 5/2006 | Slikkerveer | G02F 1/133305 349/187 |
| 2006/0119539 A1 | 6/2006 | Kato et al. | |
| 2007/0177084 A1 * | 8/2007 | Ishitani | G02F 1/133528 349/117 |
| 2008/0198097 A1 | 8/2008 | Ishino et al. | |
| 2008/0239499 A1 | 10/2008 | Fukuda | |
| 2009/0015747 A1 * | 1/2009 | Nishizawa | G02F 1/133308 349/58 |
| 2009/0115968 A1 * | 5/2009 | Sugiyama | G02B 27/017 351/221 |
| 2009/0237917 A1 * | 9/2009 | Kutnyak | A42B 3/044 362/106 |
| 2009/0243970 A1 | 10/2009 | Kato et al. | |
| 2010/0073593 A1 | 3/2010 | Sasaki et al. | |
| 2010/0091031 A1 | 4/2010 | Tsujimoto | |
| 2010/0128107 A1 | 5/2010 | Tomita | |
| 2010/0141555 A1 | 6/2010 | Rorberg et al. | |
| 2010/0195040 A1 | 8/2010 | Koganezawa | |
| 2010/0214635 A1 | 8/2010 | Sasaki et al. | |
| 2010/0226017 A1 | 9/2010 | Spaller | |
| 2010/0271710 A1 | 10/2010 | Ohashi | |
| 2011/0241975 A1 | 10/2011 | Mukawa et al. | |
| 2011/0248904 A1 | 10/2011 | Miyawaki et al. | |
| 2011/0248905 A1 | 10/2011 | Chosokabe et al. | |
| 2012/0044571 A1 | 2/2012 | Mukawa | |
| 2012/0056885 A1 | 3/2012 | Ishii et al. | |
| 2012/0127434 A1 | 5/2012 | Sasazaki et al. | |
| 2012/0154920 A1 * | 6/2012 | Harrison | G02B 3/0056 359/619 |
| 2012/0200934 A1 | 8/2012 | Fujishiro | |
| 2012/0212484 A1 | 8/2012 | Haddick et al. | |
| 2012/0218426 A1 | 8/2012 | Kaizu et al. | |
| 2012/0249891 A1 * | 10/2012 | Sato | G06F 1/1601 348/794 |
| 2012/0289858 A1 * | 11/2012 | Ouyang | A61B 10/0275 600/562 |
| 2013/0003028 A1 | 1/2013 | Lin | |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0278497 A1 | 10/2013 | Takagi et al. | |
| 2013/0300766 A1 | 11/2013 | Mukawa | |
| 2014/0009914 A1 | 1/2014 | Cho et al. | |
| 2014/0022284 A1 | 1/2014 | Chosokabe et al. | |
| 2014/0043320 A1 | 2/2014 | Tosaya et al. | |
| 2014/0104692 A1 | 4/2014 | Bickerstaff et al. | |
| 2014/0152531 A1 | 6/2014 | Murray et al. | |
| 2014/0266990 A1 | 9/2014 | Makino et al. | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2014/0340609 A1 | 11/2014 | Taylor et al. | |
| 2014/0347252 A1 | 11/2014 | Miyawaki et al. | |
| 2015/0062699 A1 | 3/2015 | Hayashi | |
| 2015/0077312 A1 | 3/2015 | Wang | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260994 A1 | 9/2015 | Akutsu et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |

(56) References Cited

U.S. PATENT DOCUMENTS

| | | |
|---|---|---|
| 2015/0277126 A1 | 10/2015 | Hirano et al. |
| 2015/0288954 A1 | 10/2015 | Sasazaki et al. |
| 2015/0338660 A1 | 11/2015 | Mukawa |
| 2015/0346494 A1 | 12/2015 | Tanaka et al. |
| 2015/0362735 A1 | 12/2015 | Akutsu et al. |
| 2015/0370075 A1 | 12/2015 | Ato et al. |
| 2016/0041394 A1* | 2/2016 | Tanaka ............... G02B 27/0172 359/630 |
| 2016/0097931 A1 | 4/2016 | Takahota et al. |
| 2016/0147069 A1* | 5/2016 | Tanaka ............... G02B 27/0172 359/632 |
| 2016/0154243 A1 | 6/2016 | Aiki |
| 2017/0052379 A1 | 2/2017 | Yang et al. |
| 2017/0069140 A1 | 3/2017 | Mukawa |
| 2017/0115112 A1 | 4/2017 | Srocka et al. |
| 2017/0115492 A1 | 4/2017 | Miyawaki et al. |
| 2017/0184857 A1 | 6/2017 | Ato et al. |
| 2017/0322420 A1 | 11/2017 | Machida et al. |
| 2018/0136472 A1 | 5/2018 | Tanaka et al. |
| 2018/0211449 A1 | 7/2018 | Mukawa |

FOREIGN PATENT DOCUMENTS

| | | | |
|---|---|---|---|
| CN | 102375235 A | 3/2012 | |
| CN | 102910127 A | 2/2013 | |
| EP | 0 679 919 A2 | 11/1995 | |
| EP | 0 716 329 A1 | 6/1996 | |
| EP | 0 908 754 A2 | 4/1999 | |
| EP | 1 191 411 A2 | 3/2002 | |
| EP | 1 267 197 A2 | 12/2002 | |
| EP | 1860612 A2 | 11/2007 | |
| EP | 2 421 276 A2 | 2/2012 | |
| GB | 2413717 A * | 11/2005 | ............ G02B 27/22 |
| JP | 62-105184 A | 5/1987 | |
| JP | 05-134208 A | 5/1993 | |
| JP | 06-003641 A | 1/1994 | |
| JP | H07-72420 A | 3/1995 | |
| JP | 07-115607 A | 5/1995 | |
| JP | 07-318850 A | 12/1995 | |
| JP | 08-082762 A | 3/1996 | |
| JP | 08-166557 A | 6/1996 | |
| JP | 08-191462 A | 7/1996 | |
| JP | 09-049999 A | 2/1997 | |
| JP | 09-133876 A | 5/1997 | |
| JP | 10-104548 A | 4/1998 | |
| JP | 10-206786 A | 8/1998 | |
| JP | 2000-352690 A | 12/2000 | |
| JP | 2002-049021 A | 2/2002 | |
| JP | 2002-341792 A | 11/2002 | |
| JP | 2004-139132 A | 5/2004 | |
| JP | 2004-233867 A | 8/2004 | |
| JP | 2005-099788 A | 4/2005 | |
| JP | 2006-317604 A | 11/2006 | |
| JP | 2007-086500 A | 4/2007 | |
| JP | 2008-224850 A | 9/2008 | |
| JP | 2010-039441 A | 2/2010 | |
| JP | 2012-042654 A | 3/2012 | |
| JP | 2012-063633 A | 3/2012 | |
| JP | 2013-045020 A | 3/2013 | |
| WO | WO 2013/076994 A1 | 5/2013 | |
| WO | WO-2013076994 A1 * | 5/2013 | ........... G02B 27/017 |

OTHER PUBLICATIONS

Chinese Office Action dated May 22, 2018 in connection with Chinese Application No. 201480002217.4, and English translation thereof.

Partial European Search Report dated Dec. 21, 2018 in connection with European Application No. 18191653.7.

European communication Pursuant to Article 94(3) EPC dated Jul. 16, 2018 in connection with European Application No. 14825860.1.

Japanese Office Action dated Nov. 27, 2018 in connection with Japanese Application No. 2015-511197 and English translation thereof.

Extended European Search Report dated Mar. 29, 2019 in connection with European Application No. 18191653.7.

* cited by examiner

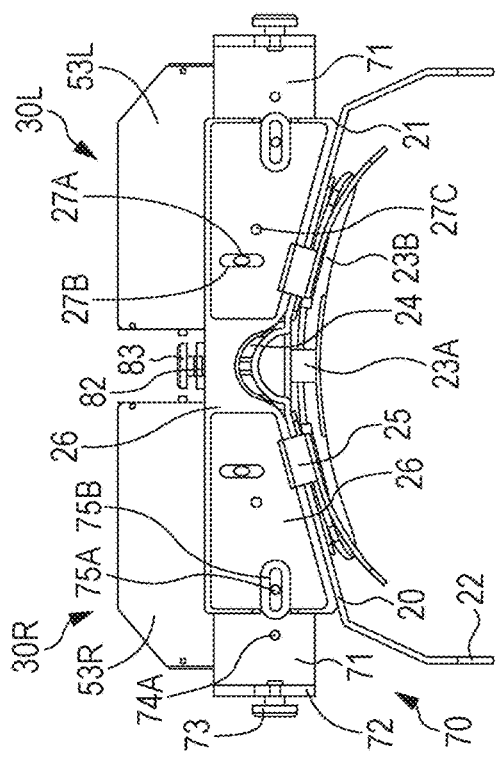
FIG. 8A
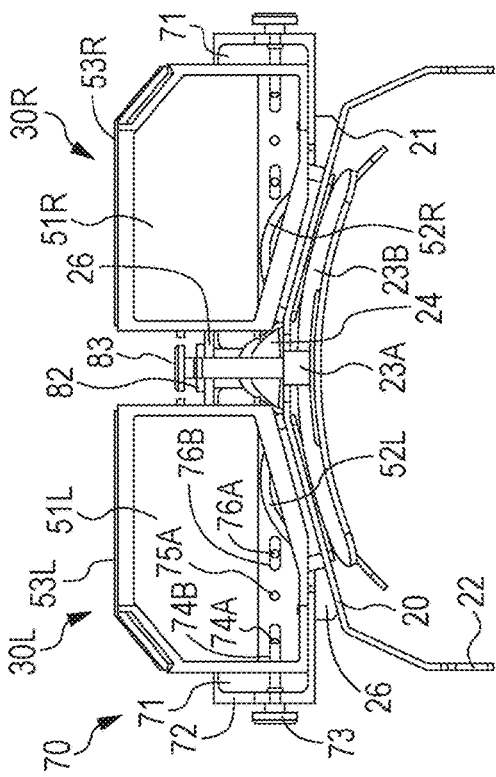
FIG. 8B
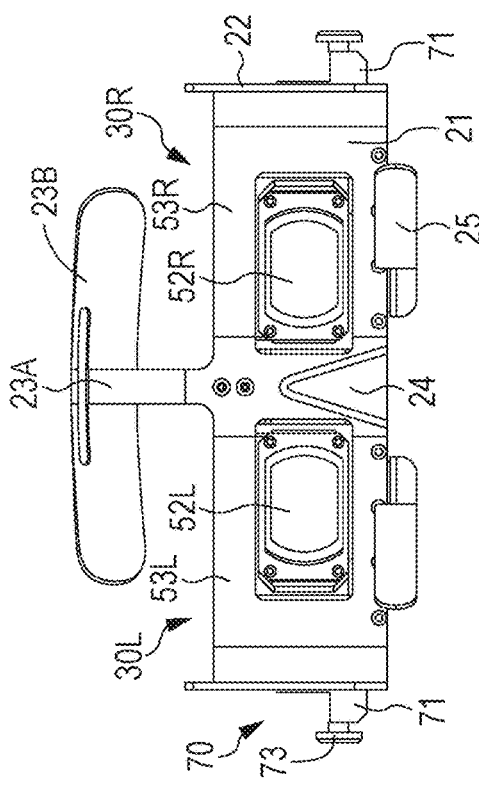
FIG. 8C
FIG. 8D

IMAGE DISPLAY DEVICE AND DISPLAY APPARATUS

CROSS-REFERENCE TO RELATED APPLICATIONS

This application claims the benefit under 35 U.S.C. § 371 as a U.S. National Stage Entry of International Application No. PCT/JP2014/058605, filed in the Japanese Patent Office as a Receiving Office on Mar. 26, 2014, which claims priority to Japanese Patent Application Number JP2013-082828, filed in the Japanese Patent Office on Apr. 11, 2013, each of which is hereby incorporated by reference in its entirety.

TECHNICAL FIELD

The present disclosure relates to an image display device and a display apparatus in which the image display device is provided, and more specifically, relates to a display apparatus that can be used as a Head Mounted Display (HMD) for example.

Background Art

A virtual image display apparatus (a display apparatus) for allowing an observer to view a two dimensional image, which is formed by an image forming device, as a virtual image that is expanded by a virtual image optical system is for example, well known from Japanese Unexamined Patent Application Publication No. 5-134208.

In the technology that is disclosed in Japanese Unexamined Patent Application Publication No. 5-134208, the virtual image display apparatus illuminates a liquid crystal display unit with light from a light source that is collimated by a lens using a polarizing plate, image light of the illuminated liquid crystal display unit is collected at a first focal point by a lens group, the collected light is reflected by a concave mirror, and reaches the retina by being collected at a second focal point by the anterior surface of the pupil using the polarizing plate. As a result of this, a user can observe a frame.

CITATION LIST

Patent Literature

PTL 1: Japanese Unexamined Patent Application Publication No. 5-134208

SUMMARY OF INVENTION

Technical Problem

Incidentally, in the technology that is disclosed in Japanese Unexamined Patent Application Publication No. 5-134208, since the virtual image display apparatus is configured from a plurality of optical systems (a lens, a lens group and a concave mirror), the virtual image display apparatus is still too large, and reductions in the size and weight thereof are insufficient as a virtual image display apparatus.

Therefore, an object of the present disclosure is to provide an image display device that is provided with an image forming device that has a simple configuration and structure for achieving a wide viewing angle while being compact and lightweight, and a display apparatus that is provided with the image display device.

Solution to Problem

A display apparatus of the present disclosure for achieving the abovementioned object includes
  (i) a frame, and
  (ii) an image display device which is attached to the frame,
  the image display device includes
    (A) an image forming device,
    (B) an optical system that guides an image from the image forming device to a pupil of an observer, and
    (C) a support member that supports the image forming device, and
  when a direction of the support member that corresponds to a first direction of an image is set as an X direction, and a direction of the support member that corresponds to a second direction of the image, which is different from the first direction, is set as a Y direction, a support surface of the support member that supports the image forming device is curved along the X direction, the Y direction or the X direction and the Y direction, and therefore, the image forming device is curved.

An image display apparatus of the present disclosure for achieving the abovementioned object includes
    (A) an image forming device,
    (B) an optical system that guides an image from the image forming device to a pupil of an observer, and
    (C) a support member that supports the image forming device, and
  when a direction of the support member that corresponds to a first direction of an image is set as an X direction, and a direction of the support member that corresponds to a second direction of the image, which is different from the first direction, is set as a Y direction, a support surface of the support member that supports the image forming device is curved along the X direction, the Y direction or the X direction and the Y direction, and therefore, the image forming device is curved.

Advantageous Effects of Invention

Since the display apparatus and the image display device of the present disclosure include a support member in which the support surface is curved along the X direction and/or the Y direction, it is possible to cause the image forming device to be curved on the basis of a simple configuration and structure. Further, since the image forming device is curved, for example, it is possible to achieve a wide viewing angle while achieving an effect of being able to reduce an optical path length difference between an optical path length of light that is output from a central portion of the image forming device and an optical path length of light that is output from an edge portion of a display region of the image forming device, and being compact and lightweight, and a display apparatus that is provided with the image display device.

Figure 3A:
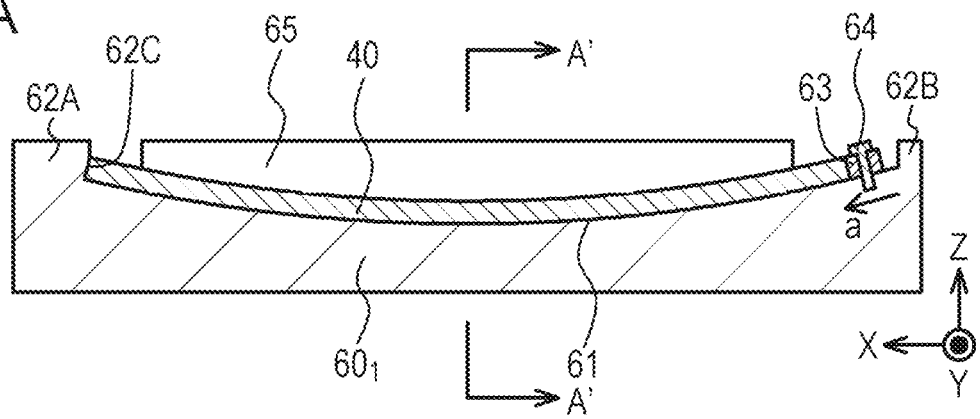
Figure 3B:
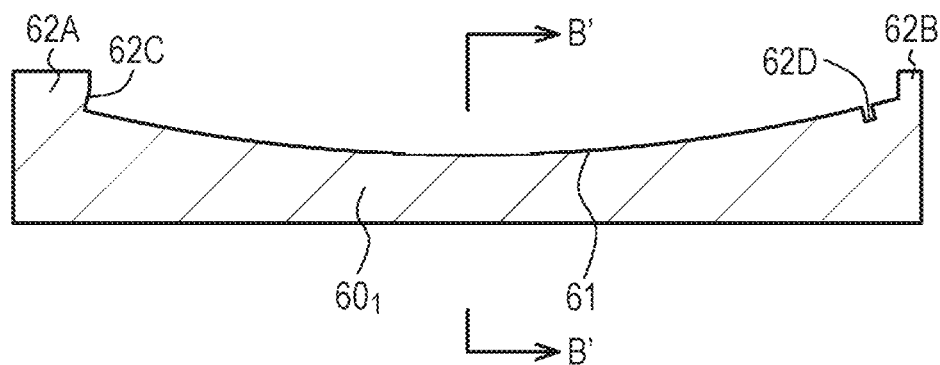
Figure 3C:
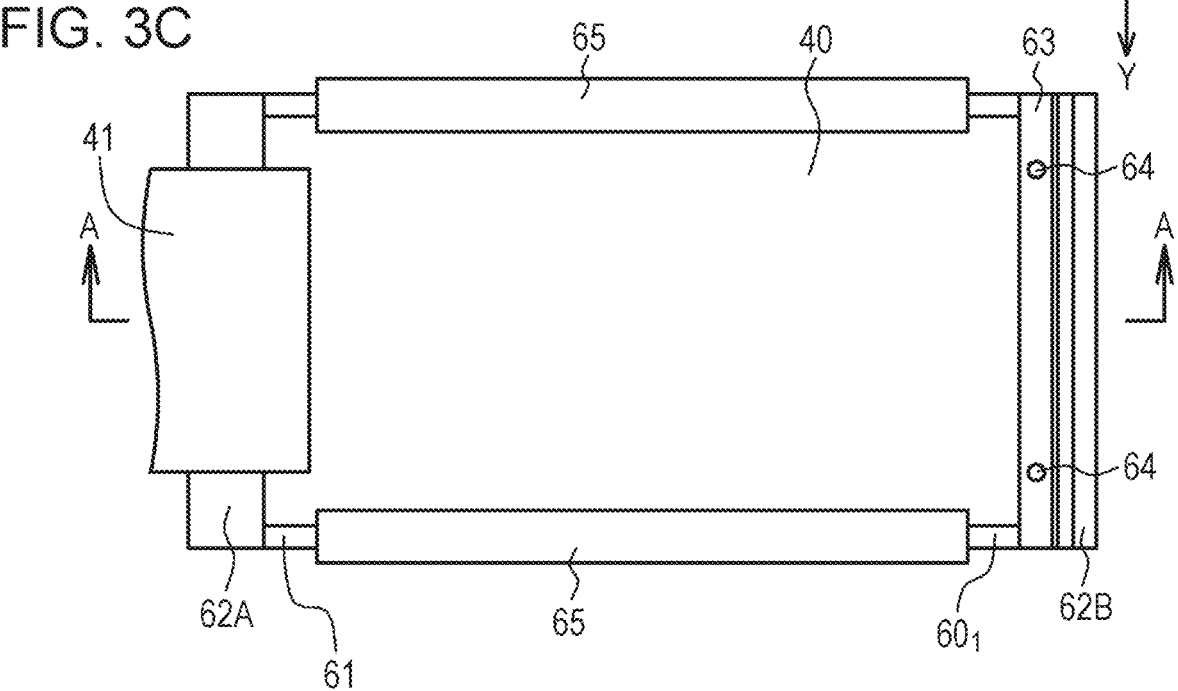

FIG. 3A is a schematic cross-sectional view of a support member and an image forming device that configure the display apparatus of Embodiment 1, FIG. 3B is a schematic cross-sectional view of the support member, and FIG. 3C is a schematic plan view of the support member and the image forming device.

Figure 4A:
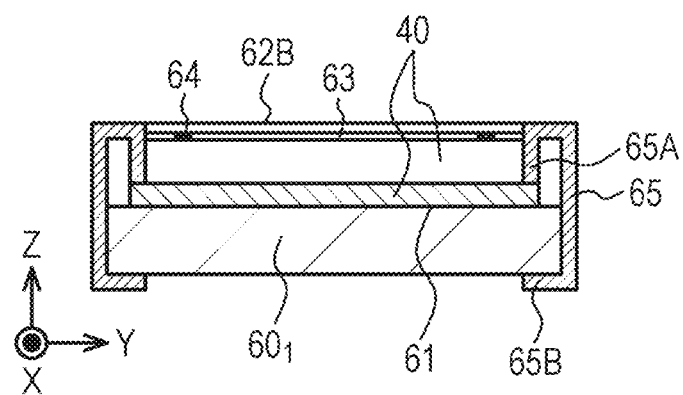
Figure 4B:
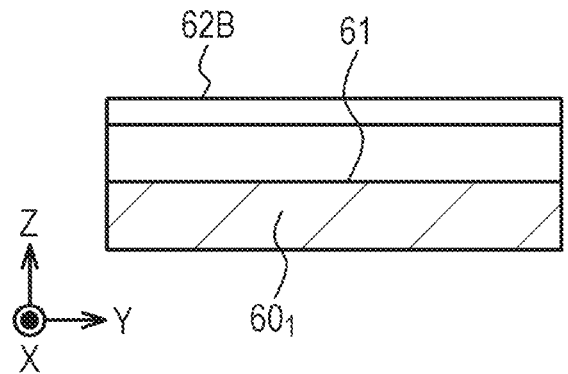

FIG. 4A and FIG. 4B are a schematic cross-sectional view along an arrow A'-A' of the support member and the image forming device that configure the display apparatus of Embodiment 1 in FIG. 3A, and a schematic cross-sectional view along an arrow B'-B' of the support member in FIG. 3B.

Figure 5A:
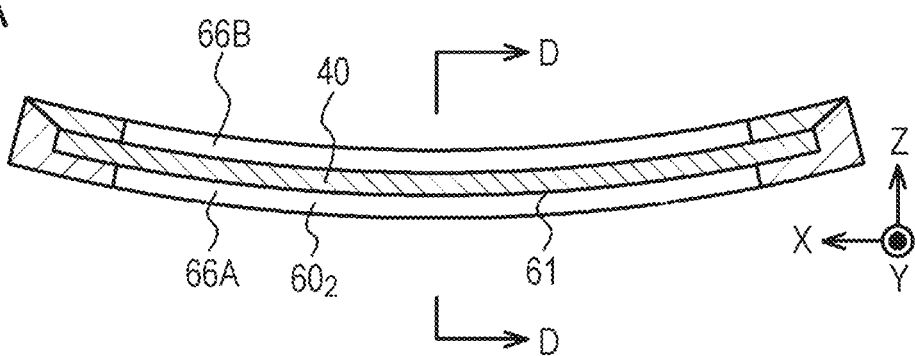
Figure 5B:
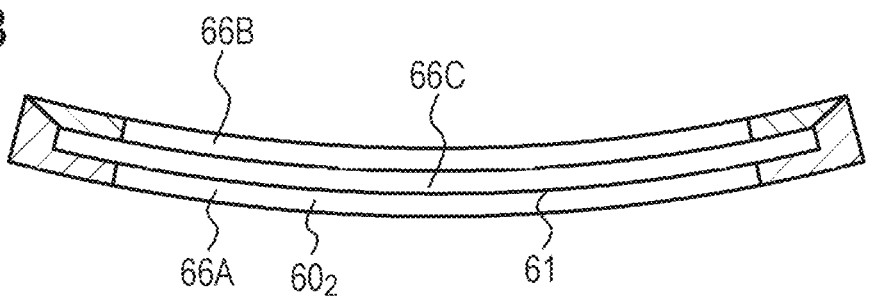
Figure 5C:
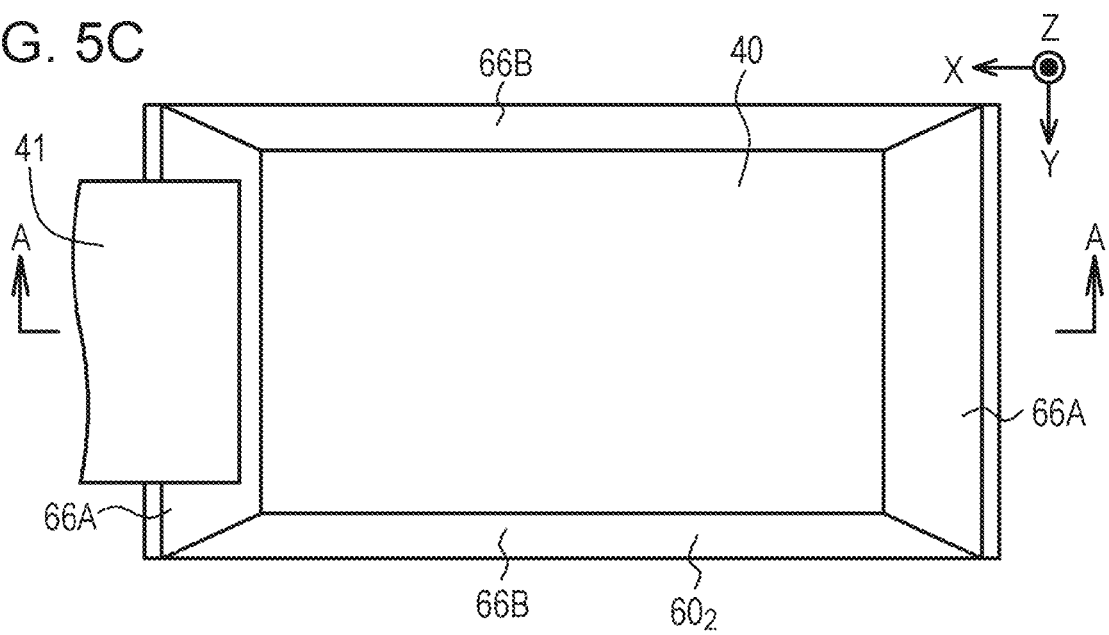
Figure 5D:
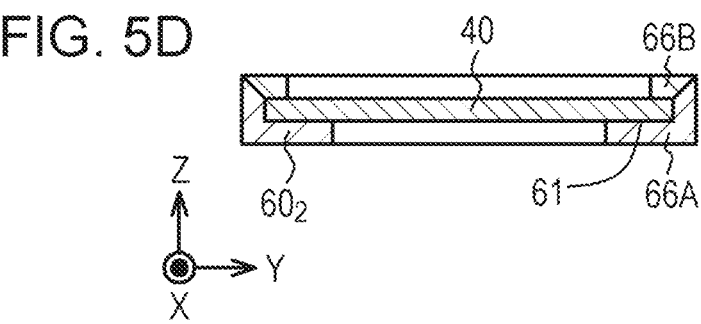

FIG. 5A is a schematic cross-sectional view of a support member and an image forming device that configure a display apparatus of Embodiment 2, FIG. 5B is a schematic cross-sectional view of the support member, FIG. 5C is a schematic plan view of the support member and the image forming device, and FIG. 5D is a schematic cross-sectional view along an arrow D-D of the support member and the image forming device in FIG. 5A.

Figure 6A:
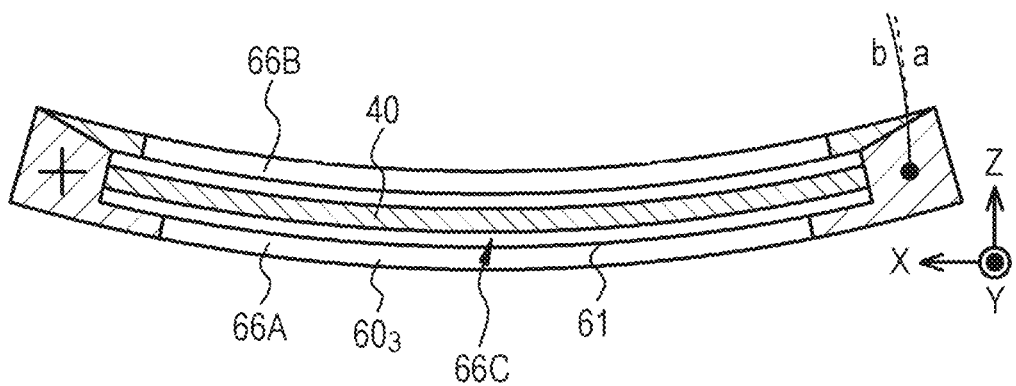
Figure 6B:
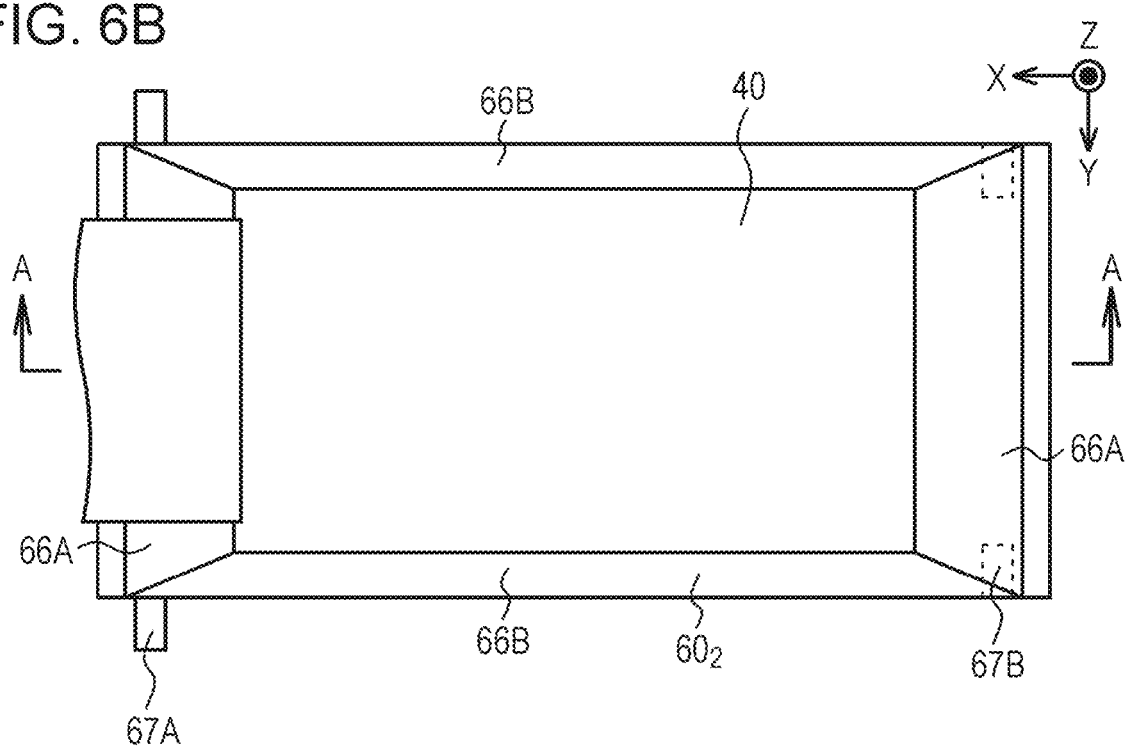
Figure 6C:
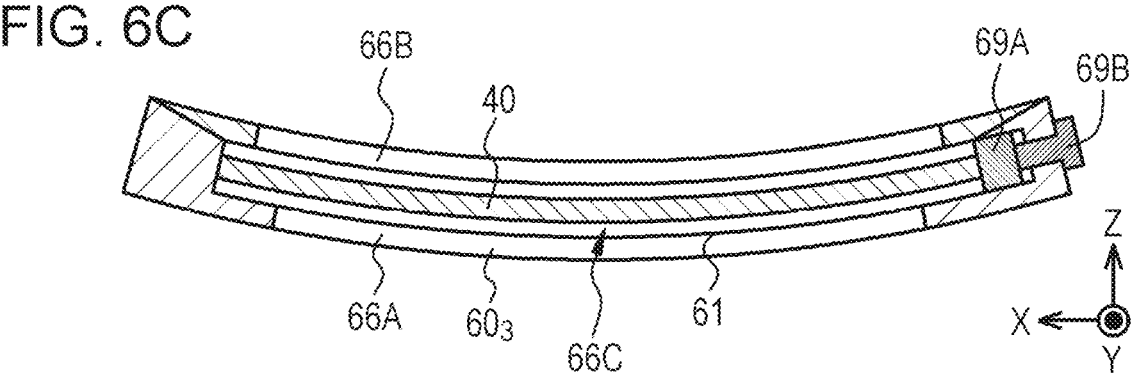

FIG. 6A is a schematic cross-sectional view of a support member and an image forming device that configure a display apparatus of Embodiment 3, FIG. 6B is a schematic plan view of the support member and the image forming device, and FIG. 6C is a schematic cross-sectional view of a support member and an image forming device that configure a modification example of the display apparatus of Embodiment 3.

Figure 7:
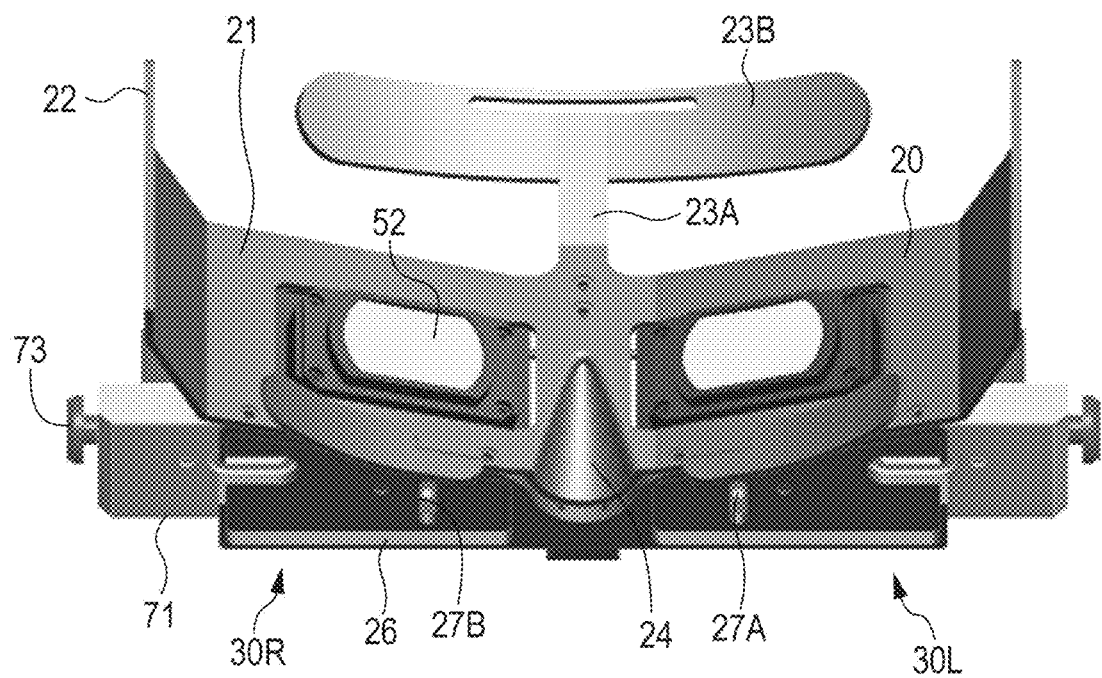

FIG. 7 is an oblique perspective view of a portion of the display apparatus of Embodiment 1.

FIGS. 8A, 8B, 8C and 8D are respectively a bottom view, a top view, a right side view and a rear view of the display apparatus of Embodiment 1.

Figure 9A:
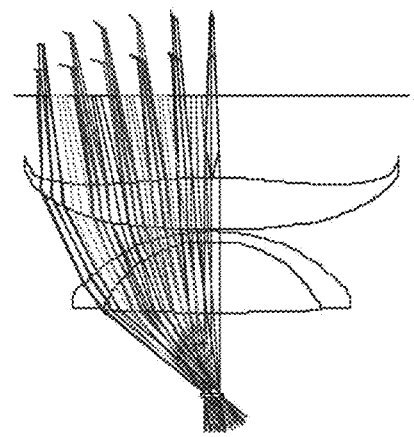
Figure 9B:
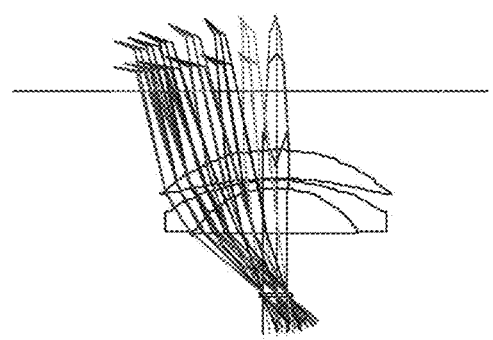
Figure 9C:
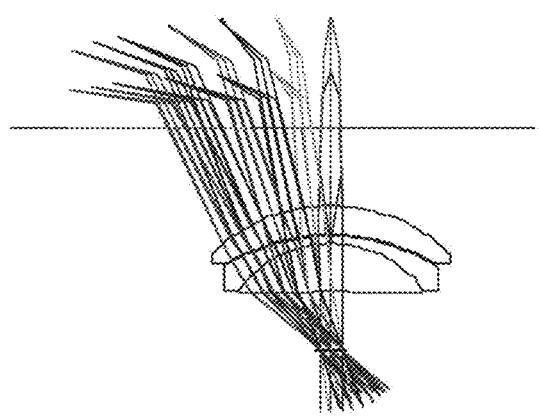

FIGS. 9A, 9B and 9C are respectively views that show how an image from the image forming device is imaged by various lenses.

Figure 10:
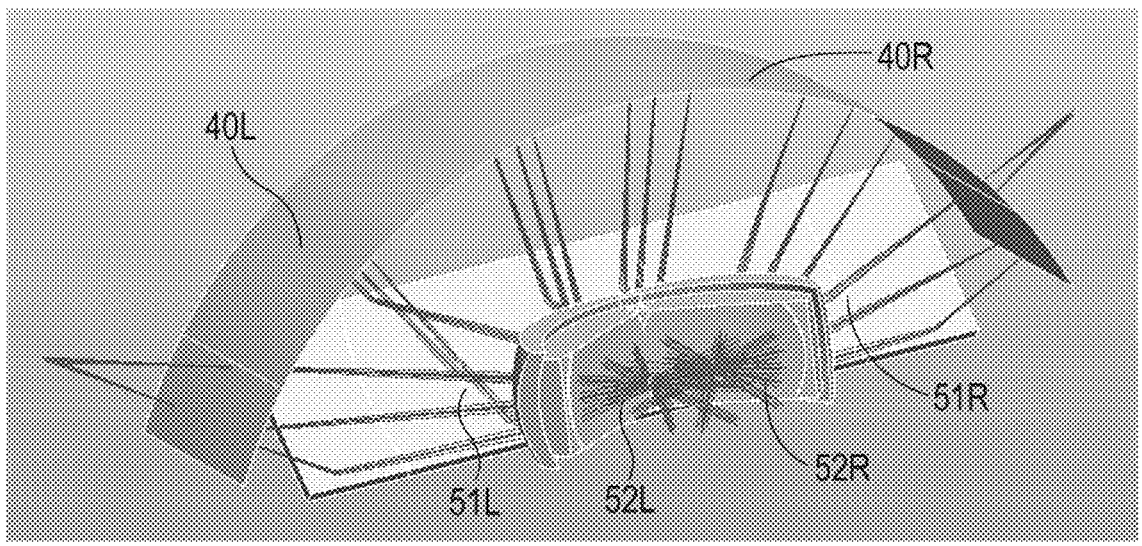

FIG. 10 is an outline view of a modification example of the display apparatus of Embodiment 1.

Figure 11:
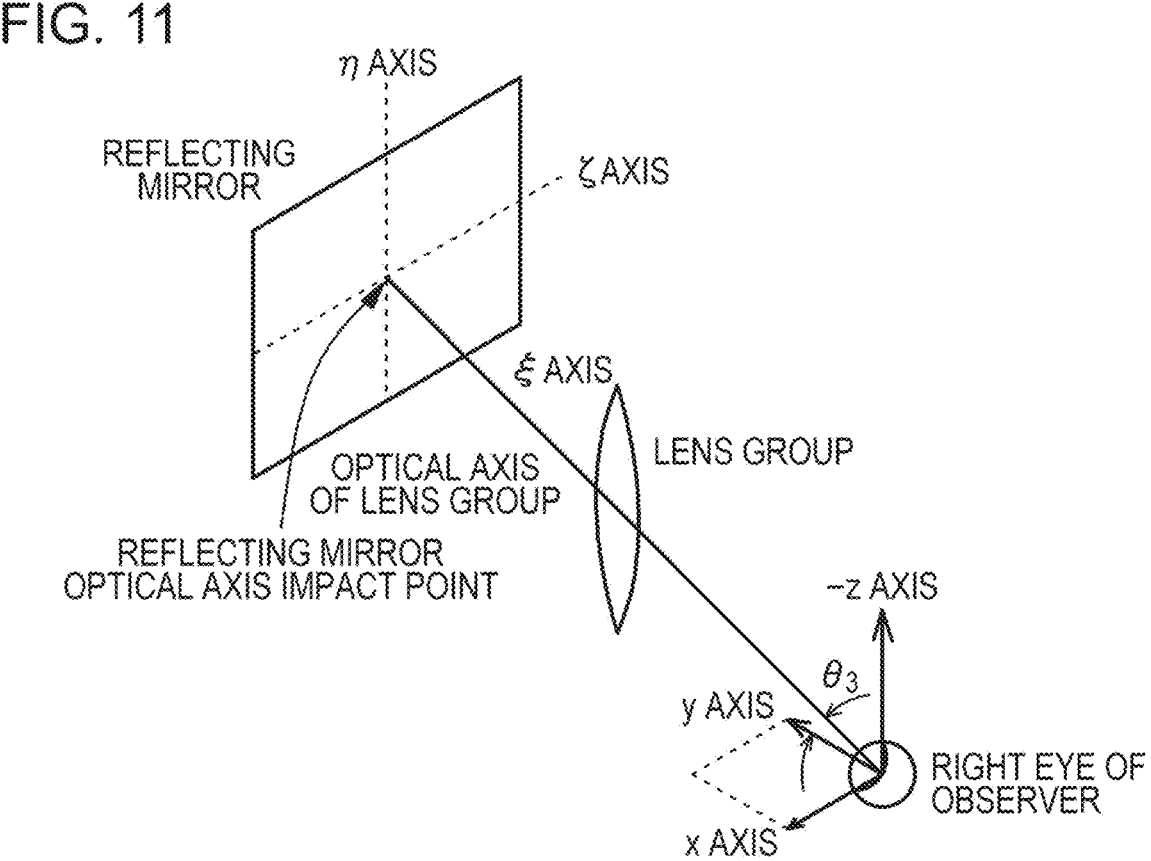

FIG. 11 is an outline view of a reflecting mirror and the like for describing the disposition states of the reflecting mirror that configures an optical system.

Figure 12A:
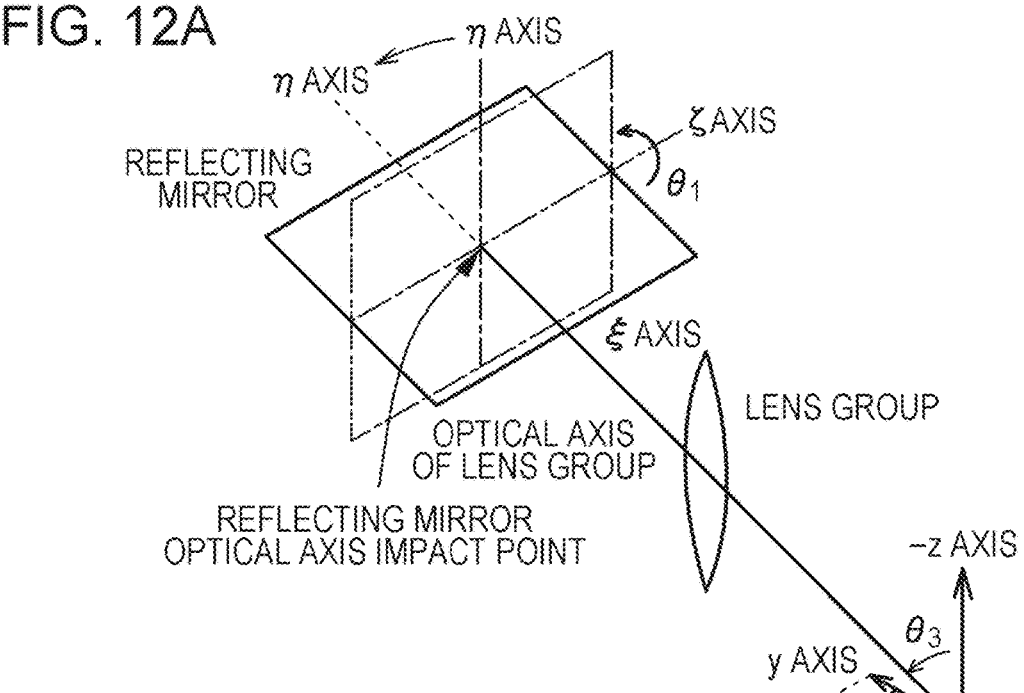
Figure 12B:
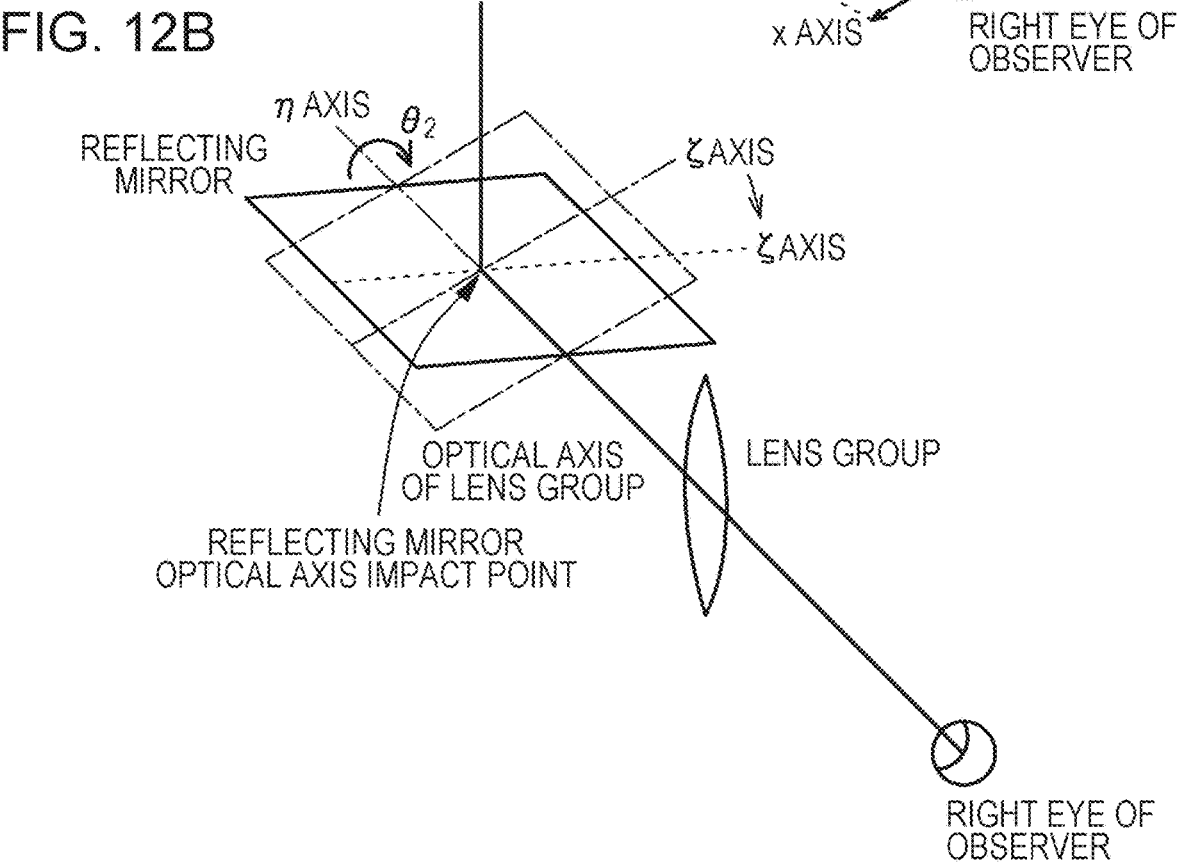

FIG. 12 Leading on from FIG. 11, FIGS. 12A and 12B are outline views of the reflecting mirror and the like for describing the disposition states of the reflecting mirror that configures the optical system.

DESCRIPTION OF EMBODIMENTS

Hereinafter the present disclosure will be described with reference to the drawings based on embodiments, but the present disclosure is not limited to the embodiments, and the various numerical values and materials that are used in the embodiments are examples. Additionally, the description will be given in the following order.
1. Overall Description Related to Display Apparatus and Image Display Device of Present Disclosure
2. Embodiment 1 (Display Apparatus of Present Disclosure)
3. Embodiment 2 (Modification example of Embodiment 1)
4. Embodiment 3 (Modification example of Embodiment 2) and Other Features Overall Description Related to Display Apparatus and Image Display Device of Present Disclosure In a display apparatus or an image display device of the present disclosure, it is possible to use a form in which a degree of curvature along an X direction of a support surface of a support member is greater than the degree of curvature along a Y direction thereof. That is, it is possible to use a form in which, when the degree of curvature is expressed as an average curvature radius, the average curvature radius along the X direction of the support surface of the support member is smaller than the average curvature radius along the Y direction. In this instance, it is possible to a form in which a first direction or the X direction corresponds to a horizontal direction that ultimately reaches a pupil of an observer, and a second direction or the Y direction corresponds to a vertical direction that ultimately reaches a pupil of an observer, may be used. There are cases in which the X direction and the Y direction are orthogonal and there are also cases in which the X direction and the Y direction are not orthogonal.

In a display apparatus or an image display device of the present disclosure that includes the abovementioned preferable form, it is possible to a form in which the support member is provided with a holding member, an external shape of an image forming device is a rectangular shape, and an outer peripheral portion of the image forming device that extends along the X direction is fixed to the support member by the holding member. Additionally, the outer peripheral portion of the image forming device refers to a region (a so-called picture-framing region) that is between an end portion of the image forming device and an end portion of a display region of the image forming device. The outer peripheral portion of the image forming device also refers to the same region below.

Alternatively, it is possible to use a form in which an external shape of the image forming device is a rectangular shape, and an outer peripheral portion of the image forming device that extends along the X direction is interposed by the support member. However, the display apparatus and the image display device of the present disclosure are not limited to these forms. Depending on the circumstances, the image forming device may be fixed to the support member using an adhesive. The support member may for example, be prepared from various plastic materials including an ABS resin, a complex material such as unilate (registered trademark, Unitka Ltd.) or FRP, a carbon fiber, a metal material such as aluminum or an alloy material.

Furthermore, in a display apparatus or an image display device of the present disclosure that includes the abovementioned preferable form, it is possible to use a form in which an external shape of the image forming device is a rectangular shape, and wiring from an outer peripheral portion of the image forming device, which extends along the Y direction, extends to an external outside. In this instance, it is possible to include a flexible printed wiring board (an FPC) as an example of the wiring. A connecting portion that is provided in an external portion of the image forming device and the wiring may be connected on the basis of a well-known method.

Furthermore, in a display apparatus or an image display device of the present disclosure that includes the abovementioned preferable form, it is possible to use a configuration in which the optical system is formed from a reflecting mirror that reflects an image from the image forming device and a lens group into which an image that is reflected by the reflecting mirror, is input. Further, in this case, it is possible to use a configuration in which the lens group is disposed between a pupil of an observer and the reflecting mirror, and the image forming device is disposed above the reflecting mirror. Furthermore, in these configurations, it is possible to use a configuration in which the lens group is formed to have one group and 3 lenses, a second lens has a negative power, and a refractive index of a material that configures the second lens is greater than a refractive index of a material that configures a first lens and a third lens, and it is possible to use a configuration in which the first lens and the third lens have a positive power. It is preferable that the second lens be configured to be a meniscus lens. It is desirable that a configuration in which the lens group is a telecentric optical system, or more specifically, in which a reflecting mirror side is a telecentric optical system, be used.

Furthermore, in a display apparatus of the present disclosure that includes the abovementioned preferable form and configuration, it is possible to use a form in which the display apparatus is provided with an image display device for a left eye and an image display device for a right eye. It is possible to include an angle from 45° to 75° as an example of an overlap (a viewing angle of both eyes) between a horizontal field of view in the image display device for the left eye and a horizontal field of view in the image display device for the right eye. Further, in a display apparatus with this kind of form, it is preferable that the display apparatus be further provided with an image display device inter-distance adjustment device that adjusts a distance between the image display device for the left eye and the image display device for the right eye. By providing the display apparatus with the image display device inter-distance adjustment device, use by observers for whom the distance between the pupils differs is made easy. Depending on the circumstances, it is possible to use a form in which the image display device is provided with a single image forming device, a single optical system that respectively guides an image from the image forming device to a pupil of a right side and a pupil of a left side of an observer, and a support member that supports the image forming device, and in this case, for example, it is possible to configure the optical system from at least a reflecting mirror and a lens group for the left eye, and a reflecting mirror and a lens group for the right eye.

Furthermore, in a display apparatus or an image display device of the present disclosure that includes the abovementioned preferable form and configuration, as long as the image forming device is flexible, it is possible for the image forming device to be any kind of image forming device, but an image forming device that is configured from an organic electroluminescence display device (an organic EL display device) is preferable. It is possible to use an organic EL display device with a well-known configuration and structure as the organic EL display device.

Furthermore, in a display apparatus that includes the abovementioned preferable form and configuration, it is possible to use a form in which a frame is mounted on a head portion of an observer. However, the display apparatus is not limited to this kind of form, and for example, the frame may be attached to an arm that extends from a ceiling or a wall, or may be attached to a freely moveable robotic arm. In addition, movements of an observer's head may be detected and movements of the frame may be made to track the movements of the observer's head.

In a case in which a form in which the frame is mounted on a head portion of an observer is used, as long as the display apparatus has a configuration and a structure in which it is possible to mount the frame on a head portion of an observer, and it is possible to attach the image display device to the frame, any kind of display apparatus can be used, for example, it is possible to use a configuration in which the display apparatus is formed from a front portion that is disposed in front of an observer, and a side portion that extend from the end portion of the front portion. The image display device is fixed to the frame, but more specifically, for example, the image display device is fixed to a lower portion of the front portion, and fixed to a retaining member that extends in a substantially horizontal direction. In addition, from a viewpoint of improving an attachment feeling of the image display device of an observer, it is desirable that a forehead rest that abuts against the forehead of an observer be attached to an upper portion of the front portion.

Furthermore, in a display apparatus or an image display device of the present disclosure that includes the abovementioned preferable form and configuration, it is possible to include a length of 83 mm to 130 mm as an example of a length $L_x$ along the X direction of a display region of the image display device. It is possible to include 320×240, 432×240, 640×480, 1024×768, 1920×1080 and the like as examples of a number of pixels of the image display device. It is possible to include an angle from 100° to 120° as an example of a horizontal viewing angle (a viewing angle of a single eye).

Hereinafter, a disposition state of a reflecting mirror will be described with reference to FIGS. 11, 12A and 12B.

In this instance, when a hypothetical flat surface that includes both pupils of an observer and an infinite distance, is set as an xy flat surface, a straight line that links both pupils of the observer is set as an x axis (or more specifically, an axial line, which is a straight line that links both pupils of the observer, and which leads from a right eye to a left eye of the observer, is set as the x axis), an optical axis of the right eye of the observer is set as a y axis (or more specifically, an axial line, which is orthogonal to the x axis, and which leads to a lens group side, is set as the y axis), a point of the reflecting mirror at which an optical axis (an optical main axis) of the lens group that configures the optical system of the image display device for the right eye, impacts upon the reflecting mirror is set as "a reflecting mirror optical axis impact point for the right eye", it is assumed that a reflecting mirror that configures the optical system of the image display device for the right eye is disposed in parallel (vertically) with an xz flat surface (refer to FIG. 11), an axial line on the reflecting mirror, which passes through the reflecting mirror optical axis impact point for the right eye and is parallel with the xy flat surface, is set as a $\zeta$ axis, an axial line on the reflecting mirror, which passes through the reflecting mirror optical axis impact point for the right eye and intersects the $\zeta$ axis, is set as an $\eta$ axis (refer to FIG. 11).

It is possible to use a form in which a flat surface mirror that configures the optical system of the image display device for the right eye is in a state of being rotated by an angle of $\theta_1=45°\pm5°$ with the $\zeta$ axis as the center thereof in which the flat surface mirror is disposed in a state in which the top of the flat surface mirror is rotated in a direction that is separated from the observer (a state before the rotation of the reflecting mirror and the axial line is shown by the dashed-dotted line in FIG. 12A. A state after the rotation of the reflecting mirror and the axial line is shown by the solid line and the dotted line in FIG. 12A), and is in a state of being rotated by an angle of $\theta_2=7°$ to $21°$ with the $\eta$ axis as the center thereof, and is disposed in a state in which a tight end of the flat surface mirror is rotated in a direction that is separated from the observer (a state before the rotation of the reflecting mirror and the axial line is shown by the dashed-dotted line in FIG. 12B. A state after the rotation of the reflecting mirror and the axial line is shown by the solid line and the dotted line in FIG. 12B).

In addition, the image forming device and the optical system of the image display device for the left eye is disposed in mirror symmetry with the image forming device and the optical system of the image display device for the right eye with respect to a hypothetical flat surface which passes through a central point of a line segment that links both pupils of the observer and is parallel to a yz flat surface. Furthermore, when an axial line that is orthogonal to the ζ axis and the η axis, is set as a ξ axis, an example of a relationship between an angle $\theta_3$ that is formed by a line ξ' axis and the y axis when the ξ axis is projected in the xy flat surface, the angle $\theta_1$ and angle $\theta_2$, will be described below in Table 1. For the angle $\theta_3$, an angle in a (−x, y) quadrant is set as a positive value (refer to FIG. 11 and FIG. 12A). It is preferable that the optical axis (the optical main axis) of the lens group intersect the center of the pupil of the observer. Furthermore, in these preferable forms, a form in which the image forming device is disposed above the reflecting mirror is preferable.

TABLE 1

| $\theta_1$ (°) | $\theta_2$ (°) | $\theta_3$ (°) |
|---|---|---|
| 45 | 5 | 9 |
| 45 | 10 | 15 |
| 45 | 15 | 22 |
| 45 | 18 | 25 |
| 45 | 20 | 29 |

In addition, the optical axis if the lens group is reflected by the reflecting mirror, a point at which the optical axis impacts upon the image forming device is set as an image forming device optical axis impact point, a hypothetical flat surface that abuts against the image forming device optical axis impact point is set as an XY flat surface, an external shape of the display region of the image forming device is set to be a rectangular shape, the X direction and the Y direction are set to be orthogonal, an axis that passes through the image forming device optical axis impact point and is parallel with the X direction is set as the x axis, an axis that passes through the image forming device optical axis impact point and is parallel with the Y direction is set as the y axis, and (X, Y, Z) coordinates of the image forming device optical axis impact point are set as (0, 0, 0). Considering this, when it is set so that X>0, a value of $(dZ/dX)_{Y=0}$ may be a positive value [that is, at Y=0, when the value of X is increased, the value of Z may also be increased monotonically], and at Y=0, when the value of X is increased while the value of $(dZ/dX)_{Y=0}$ has an arbitrary value, the value of Z may ultimately be increased. In the same manner, when it is set so that Y>0, a value of $(dZ/dY)_{X=0}$ may be a positive value [that is, at X=0, when the value of Y is increased, the value of Z may also be increased monotonically], and at X=0, when the value of Y is increased while the value of $(dZ/dY)_{X=0}$ has an arbitrary value, the value of Z may ultimately be increased. It is possible to include a curved surface, a spherical surface, an ellipsoidal surface of revolution, a hyperboloid of revolution and a paraboloid of revolution as examples of curved states of the image forming device that are represented by an aspheric function. Alternatively, when the curved state of the image forming device is represented by a function $Z_X=f(X)_{Y=0}$, $Z_Y=f(Y)_{X=0}$, it is possible to include a circle, an ellipse, a hyperbola, a parabole, an aspheric function, a three-dimensional or more polynomial equation, a two sheet line, a three sheet line, a four sheet line, a lemniscate, a limacon, a folium, a conchoid, a cissoid, an expectancy curve, a pulling arc line, a caternary, a cycloid, a trochoid, an asteroid, a semicubical parabola, a Lissajous curve, an Agnesi curve, an epicycloid, a cardioid, a hypocycloid, a clothoid curve and a helicoid as examples of these functions. Alternatively, it is possible to include a case in which the image forming device is curved along the lines of the side surface of a cylinder as an example. In a case in which the degree of curvature of the image forming device is expressed as an average curvature radius, the average curvature radius may be constant or may change.

A display apparatus that is provided with image display devices in which the degrees of curvature of the image forming device differ may be prepared, and a suitable display apparatus may be provided depending on the visual acuity of an observer, or a configuration and structure in which it is possible to change the degree of curvature of the image forming device may be used. A relationship between the radius of the side surface of the cylinder when it is assumed that the image forming device is curved along the lines of a side surface of a cylinder, and a dioptre value is shown in Table 2 below, but is not limited to this.

TABLE 2

| Dioptre Value | Radius of Cylinder Side Surface |
|---|---|
| −3 | 59 mm |
| −2 | 68 mm |
| −1 | 80 mm |
| 0 | 100 mm |

Embodiment 1

Figure 1:
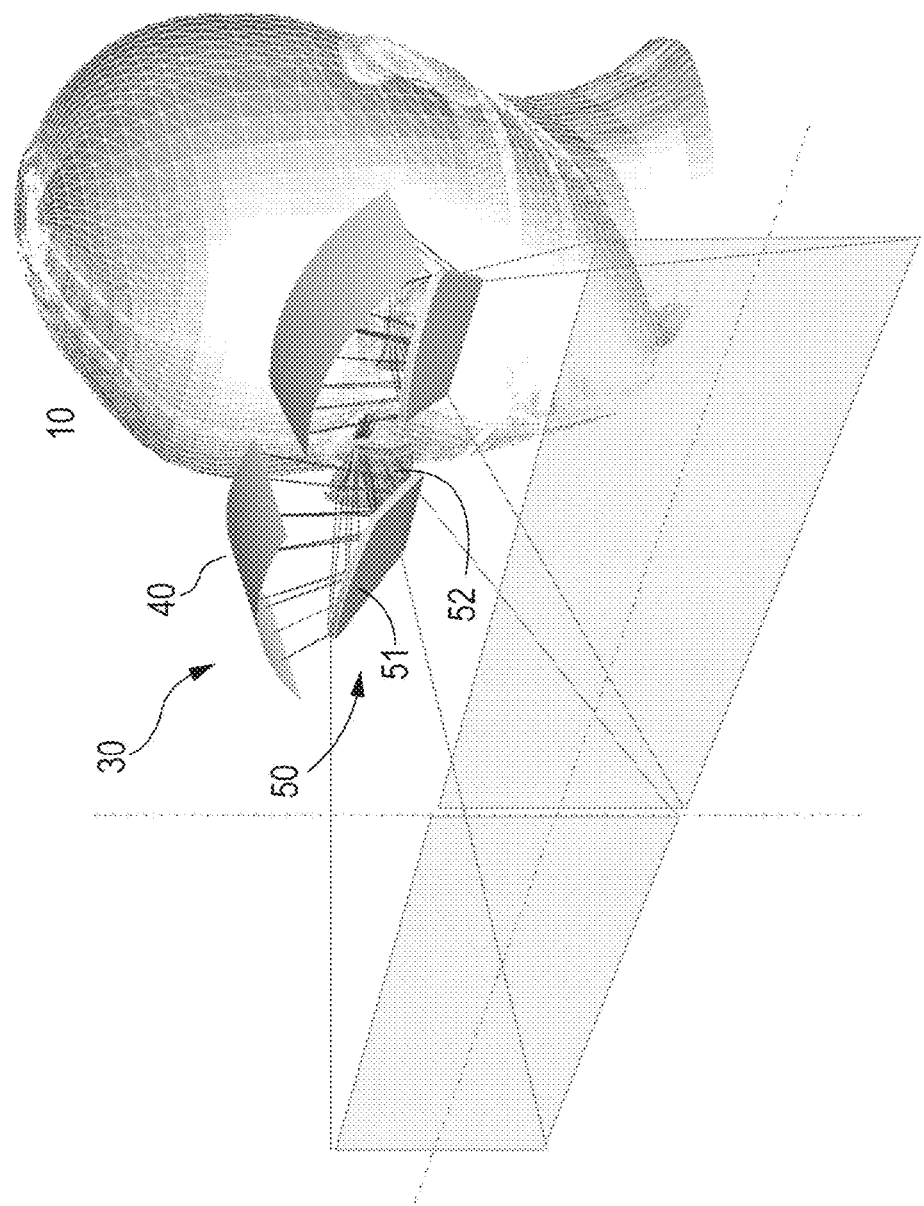
FIG. 1 is a perspective view of the main portions of a display apparatus when an observer has the display apparatus equipped.
Figure 2A:
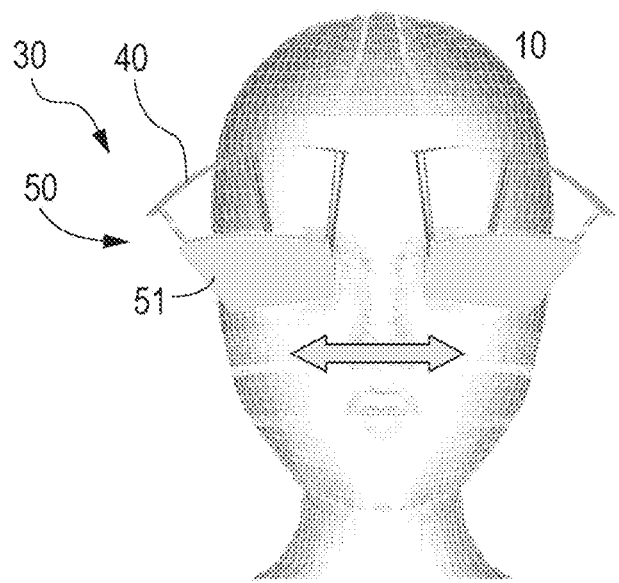
FIGS. 2A and 2B are respectively a perspective view of the main portions of a display apparatus of Embodiment 1 viewing an observer who has the display apparatus equipped, from the front, and a perspective view of the main portions of the display apparatus viewing an observer who has the display apparatus 1 equipped, from the side.
Figure 2B:
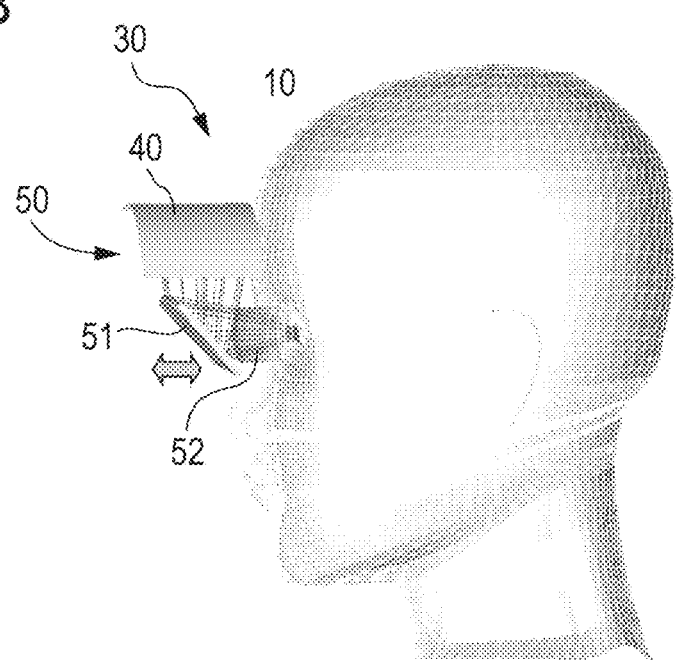

Embodiment 1 relates to a display apparatus of the present disclosure and an image display device of the present disclosure. A perspective view of the main portions of a display apparatus when an observer has the display apparatus equipped is shown in FIG. 1, a perspective view of the main portions of a display apparatus viewing an observer who has the display apparatus equipped, from the front is shown in FIG. 2A, and a perspective view of the main portions of the display apparatus viewing an observer who has the display apparatus equipped, from the side is shown in FIG. 2B. In addition, schematic cross-sectional views of a support member and an image forming device are shown in FIG. 3A and FIG. 4A, schematic cross-sectional views of the support member are shown in FIG. 3B and FIG. 4B, and a schematic plan view of the support member and the image forming device is shown in FIG. 3C. Additionally, FIG. 3A and FIG. 3B are schematic cross-sectional views along an arrow A-A in FIG. 3C, and, FIG. 4A and FIG. 4B are schematic cross-sectional views along an arrow A'-A' in FIG. 3A and an arrow B'-B' in FIG. 3B. In addition, an oblique perspective view of a portion of the display apparatus of Embodiment 1 is shown in FIG. 7, but the reflecting mirror and image forming device have been omitted from the drawing in FIG. 7. Furthermore, a bottom view, a top view, a right side view and a rear view of the display apparatus of Embodiment 1 are shown in FIG. 8A, FIG. 8B, FIG. 8C and FIG. 8D, but in order to simplify the drawings, portions of the constituent components of the image forming device and the display apparatus have been omitted from the drawing.

The display apparatus of Embodiment 1 is provided with
(i) a frame 20, and
(ii) an image display device 30 which is attached to the frame 20. Further, the image display device 30 in the display apparatus of Embodiment 1 or the image display device 30 of Embodiment 1 is provided with
(A) an image forming device 40,
(B) an optical system 50 that guides an image from the image forming device 40 to a pupil of an observer 10, and
(C) a support member $60_1$ that supports the image forming device 40.

In this instance, the frame 20 in the display apparatus of Embodiment 1 is mounted on a head portion of the observer 10, and more specifically, the display apparatus of Embodiment 1 is a head mounted device (HMD). Further, when a direction of the support member $60_1$ that corresponds to a first direction of an image (or more specifically, a horizontal direction of the image) is set as an X direction, and a direction of the support member $60_1$ that corresponds to a second direction of the image (or more specifically, a vertical direction of the image), which is different from the first direction, is set as a Y direction, a support surface of the support member $60_1$ that supports the image forming device 40 is curved along the X direction, the Y direction or the X direction and the Y direction (or more specifically, is curved along the X direction in Embodiment 1), and therefore, the image forming device 40 is curved. More specifically, the image forming device 40 is curved along the lines of the support surface of the support member $60_1$. Additionally, the external shape of the image forming device 40 and the external shape of a display region of the image forming device 40 are a rectangular shape.

More specifically, in the display apparatus or the image display device 30 of Embodiment 1, the degree of curvature along the X direction of a support surface 61 of the support member $60_1$ is greater than the degree of curvature along the Y direction. That is, when the degree of curvature is expressed as an average curvature radius, the average curvature radius along the X direction of the support surface of the support member is smaller than the average curvature radius along the Y direction. More specifically, the curvature radius along the X direction of the support surface of the support member is 100 mm, and the curvature radius along the Y direction is infinitely large. Further, in the display apparatus or the image display device 30 of Embodiment 1, when it is set so that X>0, a value of $(dZ/dX)_{Y=0}$ is a positive value. That is, at X>0 and Y=0, when the value of X is increased, the value of Z is also be increased monotonically. In addition, $(dZ/dY)_{X=0}=0$. More specifically, the image forming device 40 is curved along the lines of the side surface of the cylinder, and the radius of the side surface of the cylinder is 100 mm. In addition, an effective focal length of a lens group 52, which will be described later, is 56 mm. Additionally, preferable relationships between the radius of the side surface of the cylinder and the effective focal length of the lens group 52 are shown in Table 3 below.

TABLE 3

| Radius of Cylinder Side Surface (mm) | Effective Focal Length of Lens Group 52 (mm) |
|---|---|
| 0 | 28 |
| 100 | 56 |
| 146 | 67 |
| 238 | 95 |

Further, in the display apparatus or the image display device 30 of Embodiment 1, the support member $60_1$ is provided with a holding member 65, the external shape of the image forming device 40 is, as mentioned above, a rectangular shape, and an outer peripheral portion of the image forming device 40 that extends along the X direction is fixed to the support member $60_1$ using the holding member 65.

More specifically, the support member $60_1$ and the holding member 65 are made from aluminum. The upper surface and central portion of the support member $60_1$ abut against the support surface 61, and outer peripheral portions 62A and 62B of the support member $60_1$ that extend along the Y direction protrude from the support surface 61. A portion of the outer peripheral portion 62A that opposes the support surface 61 is a contact surface 62C, and one edge portion of the image forming device 40 that extends along the Y direction comes into contact with the contact surface 62C. In addition, an aluminum belaying member 63 is fixed to the upper surface of the support member $60_1$ by a screw 64, which screws together with a screwing portion 62D, which is formed in the upper surface of the support member $60_1$, and abuts comes into contact with the other edge portion of the image forming device 40 that extends along the Y direction. A long hole (a long hole that is long and narrow in the X direction) through which the screw 64 is passed, is provided in the belaying member 63. In this instance, due to the belaying member 63, the image forming device 40 receives a compressive force in the direction of the arrow "a" in FIG. 3A, and as a result of this, the image forming device 40, the image forming device 40 is curved without interval along the lines of the support surface 61 of the support member $60_1$.

One end portion 65A of the holding member 65 holds the outer peripheral portion of the image forming device 40 that extends along the X direction, in place, another end portion 65B of the holding member 65 engages with the bottom surface of the support member $60_1$ that extends along the X direction, and as a result of this, the outer peripheral portion of the image forming device 40 that extends along the X direction is fixed to the support member $60_1$ by the holding member 65.

Additionally, depending on the circumstances, a lower surface of the image forming device 40 and the support surface 61 of the support member $60_1$ may be fixed together using an adhesive, and in this case, it is possible to omit the holding member 65.

In addition, wiring 41, or more specifically, a flexible printed wiring board (an FPC), extends from the outer peripheral portion of the image forming device 40 that extends along the Y direction to the outside. A connecting portion that is provided in the outer peripheral portion of the image forming device 40 and the wiring 41 may be connected on the basis of a well-known method. FIG. 3C shows a state in which the wiring 41 extends from one of the outer peripheral portions of the image forming device 40 that extends along the Y direction, but the wiring 41 may extend from both of the outer peripheral portions of the image forming device 40 that extend along the Y direction.

More specifically, in the display apparatus of Embodiment 1, the image forming device 40 is configured from an organic electroluminescence display device (organic EL display device) that has a well-known configuration and structure. Additionally, the organic EL display device is configured from a first substrate, a second substrate, and a plurality of light-emitting portions that are interposed between the first substrate and the second substrate. The thickness of the image forming device 40 is a thickness that can be curved without interval along the lines of the support surface of the support member $60_1$, and for example, is 0.5 mm or less, and is for example, from 0.2 mm to 0.5 mm. In addition, the number of pixels is set as 1920×1080.

As shown in FIG. 7, FIG. 8A, FIG. 8B, FIG. 8C and FIG. 8D, the display apparatus of Embodiment 1 is provided with an image display device for the left eye 30L and an image display device for the right eye 30R. A horizontal viewing angle (a viewing angle of a single eye) in each image display device 30 is set as 100°, an overlap (a viewing angle of both eyes) between a horizontal field of view in the image display device for the left eye 30L and a horizontal field of view in the image display device for the right eye 30R is set as 70°, and a total horizontal viewing angle is set as 130°. A length $L_x$ along the X direction of the display region of each the image forming device 40 is set as 100 mm. In addition, a vertical viewing angle is set as 44°. Additionally, when the mass of the lens group in this case is set as "1", in a case in which the viewing angle of a single eye is set as 120°, the viewing angle of both eyes is set as 70°, the total horizontal viewing angle is set as 170°, and the length $L_x$ of the display region of each image forming device 40 is set as 126 mm, the mass of the lens group becomes "4.6", and the effective focal length thereof becomes 67.2 mm.

The frame 20 that is mounted on the head portion of the observer 10 is made from plastic, and is formed from a front portion 21 that is disposed in front of the observer 10, and a side portion 22 that extends from the end portion of the front portion. A hole portion 22A is provided in a back end portion of the side portion 22, and by passing a belt through the hole portion 22A, and wrapping the belt around a rear portion of the head portion of the observer, it is possible to mount the frame 20 on the head portion of the observer 10. An arm 23A extends upward from an upper portion of the front portion 21, and a forehead rest 23B that abuts against the forehead of the observer 10 is attached to a leading end portion of the arm 23A. Furthermore, a nose pad portion 24 is arranged in the front portion 21. In addition, a back portion of a retaining member 25 is attached to a lower end portion of the front portion 21, and a base portion 26 is attached to a front portion of the retaining member 25. Furthermore, a pupil/optical system inter-distance adjustment device 80, which will be described later, is attached to a leading end portion of the base portion 26, and a pedestal 71 that configures the pupil/optical system inter-distance adjustment device 80 is disposed above the base portion 26 so as to be freely slidable in an anteroposterior direction. An optical system 50L that configures the image display device for the left eye 30L is stored in a housing 53L, and an optical system 50R that configures the image display device for the right eye 30R is stored in a housing 53R. The image display device for the left eye 30L is attached to the housing 53L and the image display device for the right eye 30R is attached to the housing 53R. The housing 53L and the housing 53R are attached to the pedestal 71. As will be described below, the optical system 50L and the image display device for the left eye 30L, and the optical system 50R and the image display device for the right eye 30R are respectively disposed on the pedestal 71 so as to be freely slidable in a horizontal direction independent of one another. Additionally, the "anteroposterior direction" refers to a direction in which the lens group becomes closer to or further away from the pupil, and the "horizontal direction" refers to a direction in which the image display device for the left eye and the image display device for the right eye become mutually closer to or further away from one another.

The optical system 50 is formed from a reflecting mirror 51 that reflects an image from the image forming device 40 and the lens group 52 into which an image that is reflected by the reflecting mirror 51, is input. A reflecting mirror 51R and a lens group 52R that configure the image display device for the right eye are attached to the pedestal 71 via the housing 53R, and are capable of sliding on the base portion 26 in the horizontal direction. In the same manner, a reflecting mirror 51L and a lens group 52L that configure the image display device for the left eye are attached to the pedestal 71 via the housing 53L, and are capable of sliding on the base portion 26 in the horizontal direction. The lens groups 52 (52R and 52L) are disposed between the pupils of the observer 10 and the reflecting mirrors 51 (51R and 51L), the image forming devices 40 are disposed above the reflecting mirrors 51. Angles $\theta_1$ and $\theta_2$, which were mentioned above, are $\theta_1 = 45 \pm 5°$ and $\theta_2 = 7°$ to $21°$, and in addition, the reflecting mirror optical axis impact point is included in the xy flat surface that was mentioned above.

The lens group 52 is formed to have one group and 3 lenses, a second lens thereof has a negative power, and a refractive index of a material that configures the second lens is greater than a refractive index of a material that configures a first lens and a third lens thereof. The first lens and the third lens have a positive power. In addition, the second lens is a meniscus lens. More specifically, the effective focal length of the lens group 52 is set as 56.01 mm, a back focal length is set as 44.64 mm, a front focal length is set as −32.16 mm, and an F number is set as 14.0. A length of the lens group 52 in a horizontal direction is set as 36 mm, and a length thereof in the vertical direction is set as 20 mm. The specifications of the first lens (the lens that is closest to the pupil), the second lens, and the third lens (the lens that is closest to the reflecting mirror) are shown in Table 4 below, but the lenses are not limited to such specifications. It is preferable that a configuration in which the lens group 52 is a telecentric optical system, or more specifically, in which a reflecting mirror side is a telecentric optical system, be used. A distance between the first lens and the pupil (pupil diameter: 4 mm) of the observer 10 is set as 10 mm. Additionally, when the mass of this lens group is set as "1", the mass of a lens group in which the distance between the first lens and the pupil of the observer 10 is set as 12 mm becomes "1.7".

TABLE 4

|  | First lens | Second lens | Third lens |
| --- | --- | --- | --- |
| Refractive Index | 1.740 | 2.017 | 1.740 |
| Abbe Number | 44.8438 | 20.830 | 44.8438 |
| Effective Focal Length | 27.392 mm | −43.604 mm | 150.185 mm |
| Back Focal Length | 28.101 mm | −45.387 mm | 146.790 mm |
| Front Focal Length | −11.141 mm | 52.856 mm | −124.868 mm |
| F Number | 6.8480 | −10.9010 | 37.5463 |

Ways in which an image from the image forming device 40 is imaged by various lens groups are shown in FIG. 9A, FIG. 9B and FIG. 9C, but the lens group that is shown in FIG. 9A is a lens group of telecentric optical system, FIG.

9B is a lens group of configuration that is close to a telecentric optical system, and FIG. 9C is a normal lens group. In Embodiment 1, the lens group that is shown in FIG. 9A was used.

The display apparatus of Embodiment 1 is further provided with an image display device inter-distance adjustment device 70 that adjusts a distance between the image display device for the left eye 30L and the image display device for the right eye 30R. More specifically, the image display device inter-distance adjustment device 70 is configured from the pedestal 71, a screw feeding mechanism 73 that is attached to a side surface 72 that is positioned on an outer side of the pedestal 71, a tapped hole 75A for fixing the housing 53 to the pedestal 71 from the bottom using a retaining force in a slidable manner, guiding grooves 74B and 76B that are provided in the housing 53, a guiding groove 75B that is provided in the pedestal 71 and pins 74A and 76A that are provided in the pedestal 71, and engage with the guiding grooves 74B and 76B. Additionally, the guiding grooves 75B, 75B and 76B extend in the horizontal direction. Further, when the screw feeding mechanism 73 is rotated, the housing 53 (the housing 53L or the housing 53R) moves in the horizontal direction with respect to the base portion 26. The movement of the housing 53 is reliably performed in the horizontal direction due to the engagement of the pin 74A, the tapped hole 75A, and the pin 76A with the guiding grooves 74B, 75B and 76B. A movement distance of the housing 53L and 53R in the horizontal direction is set as ±5 mm. In this manner, by providing the display apparatus with the image display device inter-distance adjustment device 70, use by observers for whom the distance between the pupils differs is made easy. It is possible to use a latch and pinion mechanism by combining a latch mechanism and a button in place of the screw feeding mechanism 73. The housing 53R and 53L extend further upward than is shown in FIGS. 8A, 8B, 8C and 8D, and the support member $60_1$ that supports the image forming device 40 is attached to this portion of the housing 53R and 53L that extends upward, but these portions have been omitted from the drawings.

The display apparatus of Embodiment 1 is provided with the pupil/optical system inter-distance adjustment device 80 that adjusts a distance between the pupil of the observer 10 and the lens group 52. More specifically, the pupil/optical system inter-distance adjustment device 80 is configured from a side wall 82 that is attached to a leading end portion of a second retaining member 26, a screw feeding mechanism 83 that is attached to the side wall 82, a key 27A that is provided in the pedestal 71, and extends downward from the pedestal 71, a guiding groove 27B that is provided in the base portion 26 and engages with the key 27A, and a fastening portion 27C that retains the pedestal 71 with respect to the base portion 26 at a level at which the pedestal 71 is movable. When the screw feeding mechanism 83 is rotated, the pedestal 71 moves in the anteroposterior direction with respect to the base portion 26. The movement of the pedestal 71 is reliably performed in the anteroposterior direction due to the engagement of the key 27A with the guiding groove 27B. A movement distance of the pedestal 71 in the anteroposterior direction is set as ±4 mm. In this manner, by providing the display apparatus with the pupil/optical system inter-distance adjustment device 80, it becomes possible to deal with observers for whom the distance between the pupils and the lens group differs. It is possible to use a latch and pinion mechanism by combining a latch mechanism and a button in place of the screw feeding mechanism 83.

Since the display apparatus or the image display device of Embodiment 1 is provided with a support member in which the support surface is curved along the X direction, it is possible to cause the image forming device to be curved on the basis of a simple configuration and structure. More specifically, it is possible to cause the image forming device to be curved along the lines of the support surface of the support member. Further, since the image forming device is curved, it is possible achieve a wide viewing angle while achieving an effect of being able to reduce an optical path length difference between an optical path length of light that is output from a central portion of the image forming device and an optical path length of light that is output from an outer edge portion of the image forming device, and for example, suppressing an increase in the size of the lens group that configures the optical system.

Embodiment 2

Embodiment 2 is a modification example of Embodiment 1. A schematic cross-sectional view of a support member and an image forming device that configure a display apparatus or an image display device of Embodiment 2 is shown in FIG. 5A, a schematic cross-sectional view of the support member is shown in FIG. 5B, a schematic plan view of the support member and the image forming device is shown in FIG. 5C, and a schematic cross-sectional view along an arrow D-D in FIG. 5A is shown in FIG. 5D.

In the display apparatus or the image display device of Embodiment 2, the outer peripheral portion of the image forming device 40 that extends along the X direction is interposed by a support member $60_2$. The support member $60_2$ is formed from a lower side member 66A and an upper side member 66B, a kind of forehead edge member is configured by combining the lower side member 66A and the upper side member 66B, and a groove portion 66C is formed on an inside side surface of the support member $60_2$. Further, an outer peripheral portion of the image forming device 40 that extends along the X direction interlocks with the groove portion 66C. The lower side member 66A and the upper side member 66B may be fixed to one another using a screw (not shown in the drawings), or may be fixed to one another using an adhesive. It is preferable that the outer peripheral portion of the image forming device 40 that extends along the X direction be fixed to the groove portion 66C using an adhesive. Additionally, in the example that is shown in the drawings, in addition to the outer peripheral portion of the image forming device 40 that extends along the X direction, the outer peripheral portion of the image forming device 40 that extends along the Y direction is also interposed by the support member $60_2$, but only the outer peripheral portion of the image forming device 40 that extends along the X direction may be interposed by the support member $60_2$. In this case, it is desirable that the outer peripheral portion of the image forming device 40 that extends along the Y direction be fixed to the support member $60_2$ using an adhesive.

Since, with the exception of the points that are mentioned above, the configuration and structure of the display apparatus or the image display device of Embodiment 2 is the same as the configuration and structure of the display apparatus or the image display device of Embodiment 1, detailed description thereof has been omitted.

Embodiment 3

Embodiment 3 is a modification example of Embodiment 2. In Embodiment 3, the image forming device 40 is curved.

However, unlike Embodiment 2, the degree of curvature can be changed. A schematic cross-sectional view of a support member and an image forming device that configure a display apparatus or an image display device of Embodiment 3 is shown in FIG. 6A, and a schematic plan view of the support member and the image forming device is shown in FIG. 6B.

In Embodiment 3, there is a gap between the groove portion 66C and the outer peripheral portion of the image forming device 40 that extends along the X direction. Further, a protruding portion 67A and a screwing portion 67B are provided on a side surface that extends along the X direction of a support member $60_3$. The support member $60_3$ is stored in a housing (not shown in the drawings), the upper portion of which is open. The housing is attached to the upper portions of the housing 53R and 53L. A hole portion that engages with the protruding portion 67A is formed on a side surface of the housing. In addition, a guiding groove and extends substantially up and down is formed on a portion of the side surface of the housing opposing the screwing portion 67B, and it is possible to fix the support member $60_3$ to the side surface of the housing by inserting a screw into the guiding groove, and screwing the screw together with the screwing portion 67B. In this instance, a force that is applied to the X direction of the support member $60_3$ and the image forming device 40 changes. In FIG. 6A, the center of the protruding portion 67A is shown with a cross. In addition, a trajectory of a circle of the screwing portion 67B that has the center of the protruding portion 67A as the center thereof is shown by the dotted line "a", and a trajectory of the center of a through hole is shown by the solid line "b". In a case in which the screwing portion 67B is moved to the top of FIG. 6A with the center of the protruding portion 67A as the center thereof, a distance from the center of the protruding portion 67A to the center of the screwing portion 67B becomes shorter. Consequently, a compressive force is applied to the X direction of the support member $60_3$ and the image forming device 40. As a result of this, the degree of curvature of the image forming device 40 changes. Since there is a gap between the groove portion 66C and the outer peripheral portion of the image forming device 40 that extends along the X direction, it is possible to allow a change in the degree of curvature of the image forming device 40. After the degree of curvature of the image forming device 40 has been determined, the gap may be filled in with a suitable material (for example, a shim). Alternatively, an elastic material may be tucked into the gap in advance.

Additionally, as shown in FIG. 6C that shows a schematic cross-sectional view of a support member and an image forming device that configure a modification example of the display apparatus or image display device of Example 3, the a force that is applied to the X direction of the support member $60_3$ and the image forming device 40 may be changed using a push screw 68B for moving a push member 68A and a push member 68A in the X direction.

The present disclosure has been described above on the basis of preferable embodiments, but the present disclosure is not limited to these embodiments. The configuration and structure of the image display device and the image forming device that are described in the embodiments are examples, and it is possible to modify the embodiments as appropriate. It is possible to configure a projector by combining the image forming device and the support member that supports the image forming device that are described in the embodiments. Depending on the circumstances, as shown in FIG. 10 that shows an outline view, it is possible to use a form in which the image display device is provided with a single image forming device (indicated by 40R and 40L), an optical system that respectively guides an image from the image forming device to a pupil of a right side and a pupil of a left side of an observer, and a support member (not shown in the drawings) that supports the image forming device, and in this case, for example, it is possible to configure the optical system from at least a reflecting mirror 51L and a lens group 52L for the left eye, and a reflecting mirror 51R and a lens group 52R for the right eye.

Additionally, it is possible for the present technology to have the following configurations.

[1] <<Display Apparatus>>
   A display apparatus that is provided with
   (i) a frame, and
   (ii) an image display device which is attached to the frame, in which the image display device includes
      (A) an image forming device,
      (B) an optical system that guides an image from the image forming device to a pupil of an observer, and
      (C) a support member that supports the image forming device, and when a direction of the support member that corresponds to a first direction of an image is set as an X direction, and a direction of the support member that corresponds to a second direction of the image, which is different from the first direction, is set as a Y direction, a support surface of the support member that supports the image forming device is curved along the X direction, the Y direction or the X direction and the Y direction, and therefore, the image forming device is curved.

[2] The display apparatus according to [1], in which a degree of curvature along the X direction of the support surface of the support member is greater than the degree of curvature along the Y direction.

[3] The display apparatus according to [1] or [2] in which the support member includes a holding member, an external shape of the image forming device is a rectangular shape, and an outer peripheral portion of the image forming device that extends along the X direction is fixed to the support member using the holding member.

[4] The display apparatus according to [1] or [2] in which an external shape of the image forming device is a rectangular shape, and an outer peripheral portion of the image forming device that extends along the X direction is interposed by the support member.

[5] The display apparatus according to any one of [1] to [4] in which an external shape of the image forming device is a rectangular shape, and wiring from an outer peripheral portion of the image forming device, which extends along the Y direction, extends to an external outside.

[6] The display apparatus according to any one of [1] to [5] in which the optical system is formed from a reflecting mirror that reflects an image from the image forming device and a lens group into which an image that is reflected by the reflecting mirror, is input.

[7] The display apparatus according to [6] in which the lens group is disposed between a pupil of an observer and the reflecting mirror, and the image forming device is disposed above the reflecting mirror.

[8] The display apparatus according to [7] in which the lens group is formed to have one group and 3 lenses, a second lens has a negative power, and a refractive index of a material that configures the second lens is greater than a refractive index of a material that configures a first lens and a third lens.

[9] The display apparatus according to [8] in which the first lens and the third lens have a positive power.

[10] The display apparatus according to any one of [1] to [9] in which the display apparatus includes an image display device for a left eye and an image display device for a right eye.

[11] The display apparatus according to [10] in which the display apparatus further includes an image display device inter-distance adjustment device that adjusts a distance between the image display device for the left eye and the image display device for the right eye.

[12] The display apparatus according to any one of [1] to [11] in which the image display device is formed from an organic electroluminescence display device.

[13] The display apparatus according to any one of [1] to [12] in which the frame is mounted on a head portion of an observer.

[14] <<Image Display Device>>

An image display device that is provided with (A) an image forming device, (B) an optical system that guides an image from the image forming device to a pupil of an observer, and (C) a support member that supports the image forming device, in which, when a direction of the support member that corresponds to a first direction of an image is set as an X direction, and a direction of the support member that corresponds to a second direction of the image, which is different from the first direction, is set as a Y direction, a support surface of the support member that supports the image forming device is curved along the X direction, the Y direction or the X direction and the Y direction, and therefore, the image forming device is curved.

REFERENCE SIGNS LIST 10 observer
20 frame
21 front portion
22 side portion
22A hole portion
23A arm portion
23B forehead rest
24 nose pad portion
25 retaining member
26 base portion
30, 30R, 30L image display device
40 image forming device
41 wiring
50 optical system
51, 51R, 51L reflecting mirror
52, 52R, 52L lens group
53R, 53L housing
60$_1$, 60$_2$, 60$_3$ support member
61 support surface
62A, 62B outer peripheral portion
62C contact surface of outer peripheral portion
62D screwing portion
63 belaying member
64 screw
65 holding member
65A one end portion of holding member
65B other end portion of holding member
66A lower side member
66B upper side member
66C groove portion
67A protruding portion
67B screwing portion
68A push member
68B push screw
70 image display device inter-distance adjustment device
71 pedestal
72 side surface positioned on outer side of pedestal
73 screw feeding mechanism
74A, 76A pin,
75A tapped hole
74B, 75B, 76B guiding groove
80 pupil/optical system inter-distance adjustment device
82 side wall
83 screw feeding mechanism
27A key
27B guiding groove
27C fastening portion

The invention claimed is:

1. A display apparatus comprising:
(i) a frame that is mountable on a head of an observer; and
(ii) an image display device which is attached to the frame,
wherein the image display device includes
(A) a flexible organic electroluminescent image forming device,
(B) an optical system that guides an image from the image forming device to a pupil of the observer, and
(C) a support member that supports the image forming device, the support member having a continuously curved support surface on which a rear surface of the image forming device is mounted such that the image forming device conforms to a shape of the support surface,
wherein, when a direction of the support member that corresponds to a first direction of the image is set as an X direction, and a direction of the support member that corresponds to a second direction of the image, which is different from the first direction, is set as a Y direction, the support surface of the support member is continuously curved along the X direction, the Y direction or the X direction and the Y direction, and therefore, the image forming device has a continuously curved image forming surface, wherein no portion of the continuously curved image forming surface of the image forming device and no portion of the continuously curved support surface is flat and wherein the support member is provided with a mechanism configured to change a degree of curvature of the image forming device.

2. The display apparatus according to claim 1, wherein a degree of curvature along the X direction of the support surface of the support member is greater than the degree of curvature along the Y direction.

3. The display apparatus according to claim 1, wherein the support member includes a holding member, wherein an external shape of the image forming device is a rectangular shape, and wherein an outer peripheral portion of the image forming device that extends along the X direction is fixed to the support member using the holding member.

4. The display apparatus according to claim 1, wherein an external shape of the image forming device is a rectangular shape, and
wherein an outer peripheral portion of the image forming device that extends along the X direction is fixed to a groove portion of the support member.

5. The display apparatus according to claim 1, wherein an external shape of the image forming device is a rectangular shape, and wherein wiring from an outer peripheral portion of the image forming device, which extends along the Y direction, extends to an external outside.

6. The display apparatus according to claim 1,
wherein the optical system is formed from a reflecting mirror that reflects an image from the image forming device and a lens group into which an image that is reflected by the reflecting mirror, is input.

7. The display apparatus according to claim 6,
wherein the lens group is disposed between a pupil of an observer and the reflecting mirror, and
wherein the image forming device is disposed above the reflecting mirror.

8. The display apparatus according to claim 7,
wherein the lens group is formed to have one group and 3 lenses,
wherein a second lens has a negative power, and
wherein a refractive index of a material that configures the second lens is greater than a refractive index of a material that configures a first lens and a third lens.

9. The display apparatus according to claim 8,
wherein the first lens and the third lens have a positive power.

10. The display apparatus according to claim 1,
wherein the display apparatus includes an image display device for a left eye and an image display device for a right eye.

11. The display apparatus according to claim 10,
wherein the display apparatus further includes an image display device inter-distance adjustment device that adjusts a distance between the image display device for the left eye and the image display device for the right eye.

* * * * *